(12) United States Patent
Matsushima

(10) Patent No.: US 7,289,282 B2
(45) Date of Patent: Oct. 30, 2007

(54) LENS BARREL FOR HOLDING LENS

(75) Inventor: Teruaki Matsushima, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/499,706

(22) Filed: Aug. 7, 2006

(65) Prior Publication Data

US 2007/0047110 A1 Mar. 1, 2007

(30) Foreign Application Priority Data

Aug. 29, 2005 (JP) ............................. 2005-247314

(51) Int. Cl.
*G02B 7/02* (2006.01)

(52) U.S. Cl. .................. 359/819; 359/811; 359/813; 359/820; 359/822

(58) Field of Classification Search ............... 359/811, 359/813, 818–820, 822, 823, 871, 694; 396/55, 396/511, 529, 530, 533, 535, 544; 355/30, 355/53, 75; 356/512; 385/11, 16, 57, 90
See application file for complete search history.

(56) References Cited

U.S. PATENT DOCUMENTS

| | | | | |
|---|---|---|---|---|
| 4,684,231 A * | 8/1987 | Athy | .................. | 396/544 |
| 4,850,674 A * | 7/1989 | Hasselskog | .................. | 359/820 |
| 5,249,082 A * | 9/1993 | Newman | .................. | 359/813 |
| 6,078,439 A * | 6/2000 | Silhengst et al. | ............ | 359/819 |
| 6,276,843 B1 * | 8/2001 | Alcock et al. | .................. | 385/90 |
| 6,469,844 B1 * | 10/2002 | Iwase et al. | .................. | 359/819 |
| 6,760,114 B2 * | 7/2004 | Akaogi et al. | .............. | 356/512 |
| 6,867,848 B2 * | 3/2005 | Ebinuma et al. | .............. | 355/75 |
| 7,014,369 B2 * | 3/2006 | Alcock et al. | ................ | 385/57 |
| 7,113,263 B2 * | 9/2006 | Ebinuma et al. | .............. | 355/75 |

FOREIGN PATENT DOCUMENTS

JP 2003-131104 A 5/2003

* cited by examiner

*Primary Examiner*—Loha Ben
(74) *Attorney, Agent, or Firm*—Birch, Stewart, Kolasch & Birch, LLP

(57) ABSTRACT

A lens barrel for holding a lens includes a barrel body for containing the lens. A ring shaped receiving wall is formed on the barrel body, for receiving a rear face of a peripheral portion of the lens, to position the lens in an optical axis direction. Three retaining claw portions are disposed to project from the barrel body, for retaining the lens on the ring shaped receiving wall by engagement with the peripheral portion thereof. Three first through holes are formed in the barrel body, and adapted to insertion and pressure of an external adjusting rod for positioning adjustment of the lens. Second through holes are formed in the barrel body, and adapted to introduction of adhesive agent for attaching the lens on the barrel body. The retaining claw portions and the first through holes are arranged at a regular pitch on a circumference of the barrel body.

8 Claims, 4 Drawing Sheets

US 7,289,282 B2

LENS BARREL FOR HOLDING LENS

BACKGROUND OF THE INVENTION

1. Field of the Invention

The present invention relates to a lens barrel for holding a lens, and more particularly, relates to a lens barrel for holding a lens in which a lens mounted in the lens barrel can be adjusted in relation to decentering readily with a simple construction.

2. Description Related to the Prior Art

There are various optical instruments such as a liquid crystal projector including an optical system. A lens apparatus in the optical system is constituted by a combination of various lenses. A plurality of types of lens barrels contain the lenses, and include stationary and movable barrels. The movable barrel contains a component of the lenses for focusing or zooming, and is movable in the optical axis direction. The stationary barrel contains a component of the lenses which is stationary on the optical instrument having the lens apparatus.

As the lens apparatus is obtained by assembling the lens barrels, the lens must be positioned exactly in the lens barrels before intended optical performance can be acquired. This is important particularly if the lens has a high power or operates for correcting aberration. It is known in the art to adjust the lens by finely shifting in a plane perpendicular to an optical axis before securing on the lens barrel. An example of this is disclosed in JP-A 2003-131104.

In JP-A 2003-131104, three projections are formed on the periphery of the lens. A tool for adjustment is used to push the projections after mounting the lens in the lens barrel for adjusting parallel decentering. This requires molding the lens together with the projections. However, there is a problem in irregularity in flow or resin in the vicinity of the projections in the course of injection of resin into molds. Also, distortion may occur in an optical surface due to influence of a sink mark or shrink mark of the resin. The disclosed method in the known document is disadvantageous in view of optical performance.

In FIG. 4, a through hole 3a is formed in a barrel body 3 of a lens holding barrel or lens barrel 2 at each of three points which rotationally divide the circumference equally. An external adjusting rod or pin 4 is moved through the through hole 3a in and out to adjust a lens 5 in relation to parallel decentering. After this, the adjusting rod 4 is removed. Adhesive agent is introduced through the through hole 3a to attach the lens 5 on the barrel body 3 by adhesion. For the adjustment, a receiving surface 6 of the inside of the lens barrel 2 must be pressed on the lower surface of the lens 5 for keeping an orientation perpendicular to the optical axis. To this end, a weighting device 7 in a ring shape is placed on the lens 5. An auxiliary lens 9 is incorporated in a platen or surface table 10. The lens barrel 2 is positioned on the surface table 10, is subjected to application of a laser beam S. A CCD or area sensor 12 receives incidence of the laser beam S. The adjusting rod 4 is moved at an adjusted amount so as to set a position of incidence of the laser beam S at the home position of the CCD 12, so as to adjust the lens 5 in relation to parallel decentering.

Furthermore, a use of clip shaped spring 15 of FIG. 5 is known in place of the weighting device 7. The clip shaped spring 15 keeps the lens 5 pressed on the receiving surface 6. The adjusting rod 4 is moved into and out of the through hole 3a to adjust the lens 5 in relation to parallel decentering. Note that the lens barrel 2 in FIG. 5 is set on the platen or surface table 10 in an orientation reverse to that of FIG. 4. However, the lens barrel 2 can be oriented in the same manner as that of FIG. 4.

According to JP-A 2003-131104 or FIGS. 4 and 5, it is important to move the lens in parallel with the receiving surface while the lens is pressed suitably on the receiving surface. In the method of JP-A 2003-131104, an adjuster as a tool causes a projection to press the lens on the receiving surface, at the same time as the lens is moved in parallel with the receiving surface. However, a shortcoming lies in unwanted forming of the projection on the lens integrally. In FIG. 4 or 5, a problem lies in a combined use of the weighting device 7 or the clip shaped spring 15. If force of biasing of the clip shaped spring 15 becomes weak with time, it is difficult to press the lens 5 on the receiving surface 6 in a well balanced condition.

SUMMARY OF THE INVENTION

In view of the foregoing problems, an object of the present invention is to provide a lens barrel for holding a lens in which a lens mounted in the lens barrel for holding a lens can be adjusted in relation to decentering readily with a simple construction.

In order to achieve the above and other objects and advantages of this invention, a lens barrel for holding a lens includes a barrel body for containing the lens. A ring shaped receiving wall is formed on the barrel body internally, for receiving a rear face of a peripheral portion of the lens, to position the lens in an optical axis direction. Plural retaining claws are disposed on the barrel body, for retaining the lens on the ring shaped receiving wall by engagement with the peripheral portion thereof. Plural first through holes are adapted to insertion and pressure of an external adjusting rod to the peripheral portion in a direction crosswise to the optical axis direction, for positioning adjustment of the lens. Plural second through holes are adapted to introduction of adhesive agent for attaching the lens to the barrel body.

The retaining claws and the first through holes are arranged at a regular pitch rotationally on a circumference of the barrel body.

The plural retaining claws are at least three retaining claws, and the plural first through holes are at least three through holes.

The plural first through holes are disposed close to the retaining claws, and the plural second through holes are disposed offset from the retaining claws.

Furthermore, two slits are formed in the barrel body, so positioned that each of the plural retaining claws is located therebetween, for partial separation thereof, and for imparting resiliency thereto.

Each of the plural first through holes is located in a position between the slits associated with one of the retaining claws.

The plural second through holes are disposed closer to the receiving wall than the plural first through holes.

In a preferred embodiment, said first through holes are used also by way of said second through holes.

Furthermore, a connection tubular portion is disposed to project from a rear end of said barrel body.

The second through holes are disposed outside the ring shaped receiving wall and close to the connection tubular portion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
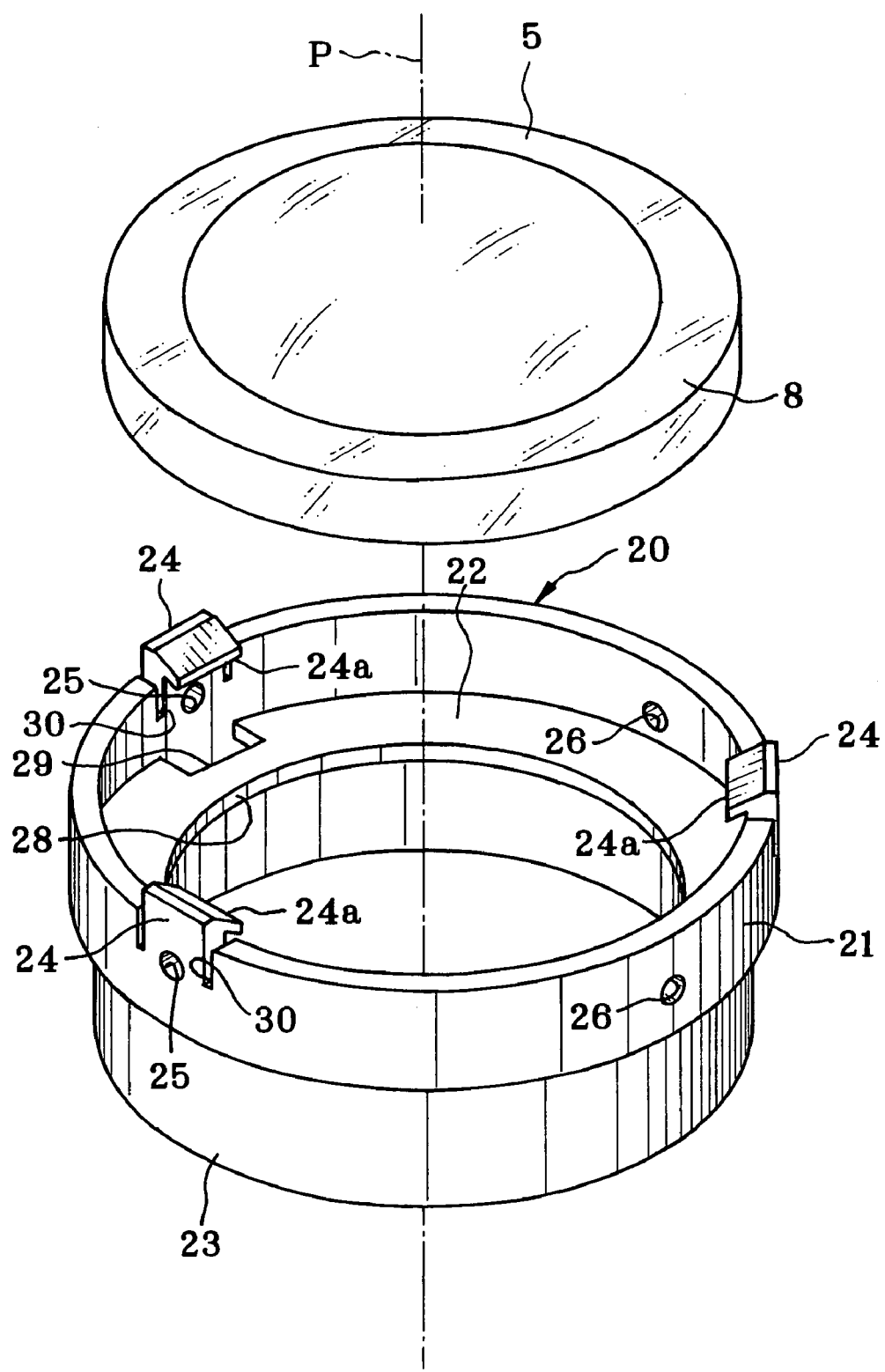
FIG. 1 is a perspective view illustrating a lens barrel in the course of assembly.

In FIG. 1, a lens holding barrel or lens barrel 20 is illustrated. The lens barrel 20 is one piece formed from a plastic material by injection molding, and has a barrel body 21, a ring shaped receiving wall 22, and a connection tubular portion 23. A lens 5 is surrounded by the barrel body 21. The ring shaped receiving wall 22 supports the lens 5. The connection tubular portion 23 is used for connection with an other barrel. Plural retaining claw portions 24 are formed on an upper edge of the barrel body 21, and are arranged at a pitch of a ⅓ rotation from one another. Slits 30 are formed on sides of the retaining claw portions 24. The retaining claw portions 24, when pressed in a direction away from the optical axis P, are deformed resiliently. The retaining claw portions 24 come to their original position when released from the pressure. An inner diameter of the barrel body 21 is greater than an outer diameter of the lens 5. A claw end 24a for hooking of the retaining claw portions 24 protrudes in a manner inwards from the inside of the barrel body 21. An end point of the claw end 24a is positioned nearer to the optical axis P than the circumference of the lens 5.

Plural first through holes 25 for adjustment are formed through the barrel body 21 and disposed in base portions of respectively the retaining claw portions 24. Plural second through holes 26 for adhesive agent are formed in the barrel body 21 and disposed nearer to the ring shaped receiving wall 22 than the first through holes 25. The second through holes 26 are arranged at a pitch of a ⅓ rotation in the rotational direction of the barrel body 21, and are offset from the first through holes 25 by 60 degrees from the first through holes 25 about the optical axis P. Note that positions of the first through holes 25 may not be at base portions of the retaining claw portions 24. The number of the first through holes 25 may be four or more, the first through holes 25 being disposed at an equal height from the ring shaped receiving wall 22. Also, the number of the second through holes 26 may be any integer equal to or more than two (2).

An aperture 28 is defined in the ring shaped receiving wall 22 perpendicular to the optical axis P and disposed between the barrel body 21 and the connection tubular portion 23. A front surface of the ring shaped receiving wall 22 is a receiving surface. An opening 29 is formed in the ring shaped receiving wall 22, and positioned directly behind each of the retaining claw portions 24. The lens barrel 20 inclusive of the retaining claw portions 24 is formed by a set of molds of which main molds are openable in upward and downward directions. A lower surface 24b of the claw end 24a of the retaining claw portions 24 is formed by a core of a lower mold, which protrudes through the opening 29.

Figure 2A:
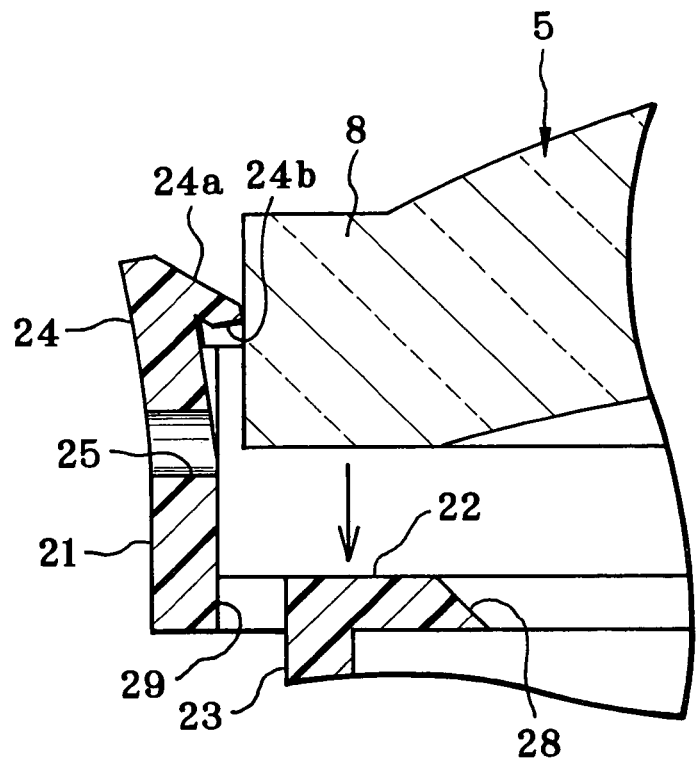
FIG. 2A is a section, partially broken illustrating a retaining claw portion and relevant elements.
Figure 2B:
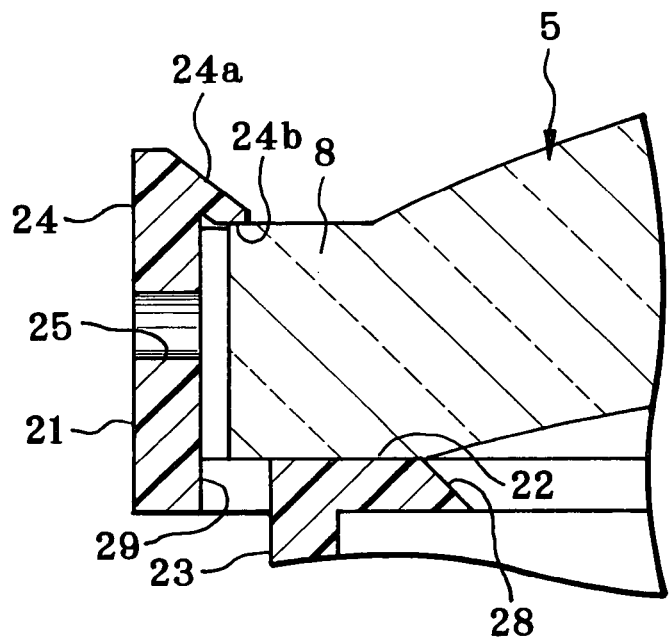
FIG. 2B is a section, partially broken illustrating the same as FIG. 2A but in a state after completing the assembly.

The lens 5 is pushed in a downward direction to the barrel body 21 for assembly to the lens barrel 20. In FIG. 2A, the retaining claw portion 24 is deformed in a direction away from the optical axis P. When a lower surface of the lens 5 contacts the ring shaped receiving wall 22, an upper surface of a peripheral portion 8 of the lens 5 is positioned lower than the level of the claw end 24a. The retaining claw portion 24 comes to the initial position of FIG. 2B, to clamp the lens 5 in cooperation with the ring shaped receiving wall 22 by pressure of the claw end 24a to the upper surface of the peripheral portion 8 of the lens 5. Note that it is preferable to form the lower surface 24b of the claw end 24a with an inclination with an increasing height toward the optical axis in FIG. 2B. This is effective in having a smaller precision in the dimension of the retaining claw portions 24 and the claw end 24a.

Figure 3:
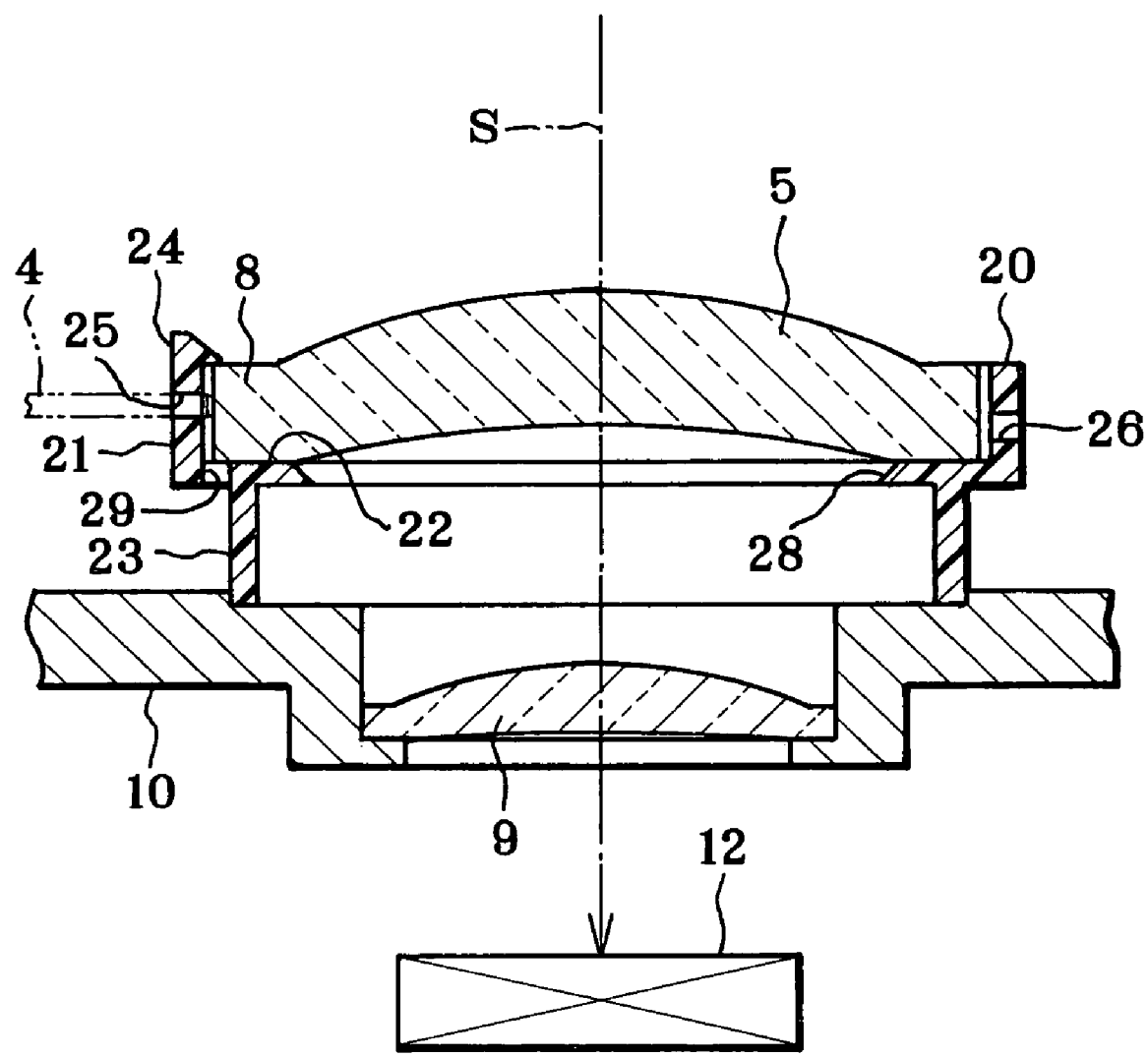
FIG. 3 is a cross section illustrating the lens barrel in the course of adjustment in relation to decentering.
Figure 4:
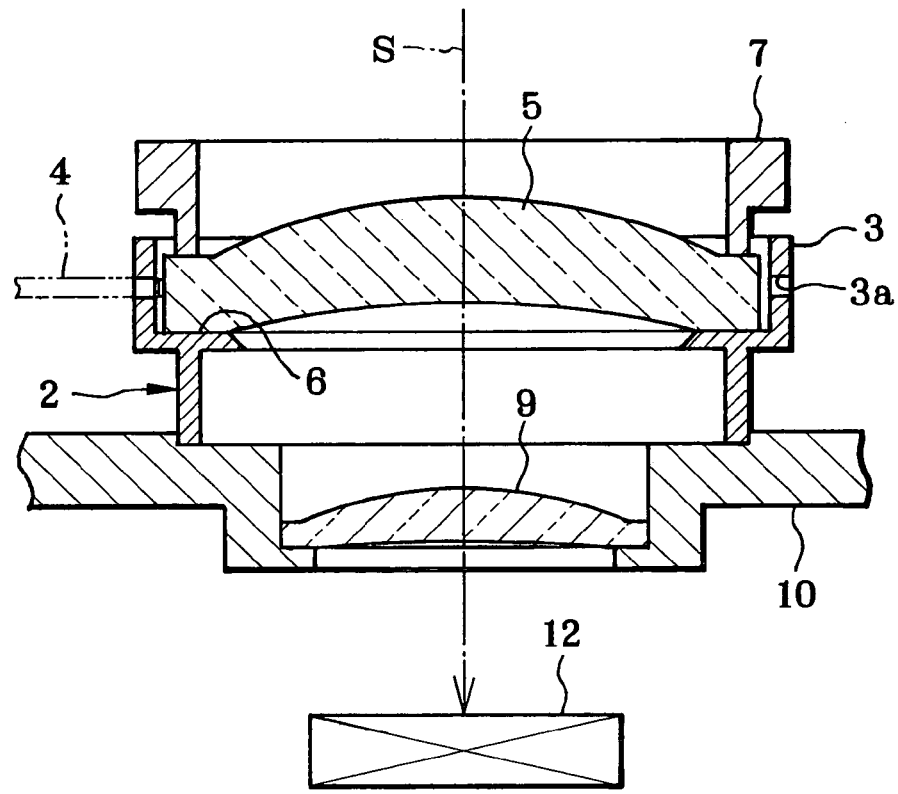
FIG. 4 is a cross section illustrating one lens barrel of the prior art.
Figure 5:
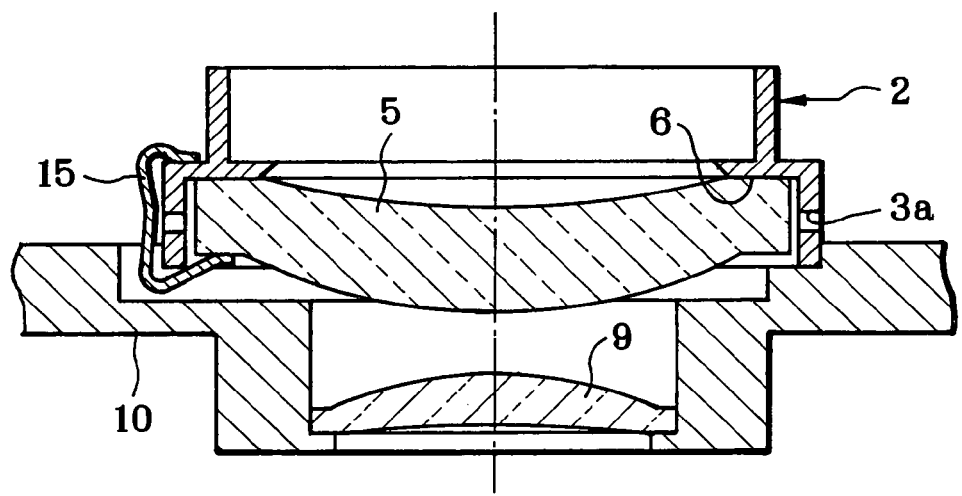
FIG. 5 is a cross section illustrating a lens barrel of the prior art with a clip shaped spring.

After clamping the lens 5 resiliently between the retaining claw portions 24 and the ring shaped receiving wall 22, a platen or surface table 10 is provided with the lens barrel 20 as illustrated in FIG. 3. The first through holes 25 are circular as viewed in a section. An external adjusting rod or pin 4 has a diameter slightly smaller than the inner diameter of the first through holes 25. The adjusting rod 4 is moved through the first through hole 25 in and out for the adjustment of parallel decentering. When the adjusting rod 4 is thrust to press the lens 5 with force higher than retaining force of the retaining claw portions 24, the lens 5 moves in parallel with the ring shaped receiving wall 22. Even when the adjusting rod 4 in contact with the lens 5 through one of the first through holes 25 is released from manual pressure, the adjusting rod 4 remains inserted by the inside of the first through hole 25. Thus, at least one of the three adjusting rods 4 is caused to move back by the movement of the remaining two adjusting rods 4 when those push the peripheral portion 8 of the lens 5. Note that the shape of the first through hole 25 or the adjusting rod 4 may be other than a circular shape.

There is a CCD or area sensor 12, with which a direction of a laser beam S is determined for incident at a home position in a positioned manner relative to the platen or surface table 10. If the lens 5 is decentered with reference to the lens barrel 20 in parallel, the laser beam S becomes incident at a point different from the home position of the CCD 12. An output of the CCD 12 is evaluated to simulate and display a relationship between the position of incidence of the laser beam S and the coordinate of the home position. Thus, the point of the incidence of the laser beam S is indicated in a manner offset from the home position according to the amount of parallel decentering of the lens 5. In view of this, the adjusting rod 4 is caused to push the peripheral portion 8 of the lens 5 for acquiring coincidence of those, to move the lens 5 in parallel with the ring shaped receiving wall 22.

Furthermore, it is possible to automate the adjusting system by controlling movement of the adjusting rod 4 according to arithmetic processing of an output of the CCD 12, its amount of offsetting from the coefficient of the home position, and a direction of the offsetting. Also, a parallel beam from a collimator may be used in place of the laser beam S. A screen may be disposed in place of the CCD 12. Coincidence between a position of incidence of the parallel beam and the home position may be observed by use of a microscope so as to adjust the adjusting rod 4 in relation to parallel decentering.

After adjustment of the lens 5 in relation to parallel decentering, adhesive agent is introduced through the second through holes 26 in keeping the three adjusting rods 4 positioned after the adjustment. A space between the peripheral portion 8 of the lens 5 and the inner surface of the barrel body 21 is filled by the adhesive agent, which is hardened to fix the lens 5 on the lens barrel 20. After this, the adjusting rod 4 is removed from the first through hole 25. The lens 5 can be prevented from offsetting after the adjustment because of the fixation of the adjusting rod 4 in the adjusted state. This is effective in eliminating influence of external force to the peripheral portion 8 of the lens 5 during introduction of the adhesive agent and its hardening.

If the force of the retaining claw portions 24 retaining the lens 5 is higher than external force applied to the lens 5 in a period from the introduction of adhesive agent until hardening, the adjusting rod 4 can be removed upon completion of the adjustment in relation to parallel decentering. Consequently, the first through hole 25 can be also used as paths for introducing adhesive agent after removal of the adjusting rod 4 by eliminating the second through holes 26 of the above embodiment.

In the above embodiment, the lens barrel for the lens is single. However, a plurality of lens barrels according to the invention may be combined together, to construct a lens apparatus of a composite form. One or more lens barrels can be constructed according to the invention. The lens apparatus obtained by assembling those may be set on the platen or surface table. One or more lenses in those can be adjusted in relation to parallel decentering, and can be fixedly positioned.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens barrel for holding a lens, comprising:
   a barrel body for containing said lens;
   a ring shaped receiving wall, formed on said barrel body internally, for receiving a rear face of a peripheral portion of said lens, to position said lens in an optical axis direction;
   plural retaining claws, disposed on said barrel body, for retaining said lens on said ring shaped receiving wall by engagement with said peripheral portion thereof;
   plural first through holes, formed in said barrel body, adapted to insertion and pressure of an external adjusting rod to said peripheral portion in a direction crosswise to said optical axis direction, for positioning adjustment of said lens; and
   plural second through holes, also formed in said barrel body, adapted to introduction of adhesive agent for attaching said lens to said barrel body.

2. A lens barrel as defined in claim 1, wherein said retaining claws and said first through holes are arranged at a regular pitch rotationally on a circumference of said barrel body.

3. A lens barrel as defined in claim 2, wherein said first through holes are used also by way of said second through holes.

4. A lens barrel as defined in claim 2, further comprising a connection tubular portion disposed to project from a rear end of said barrel body, and having a smaller diameter than said barrel body.

5. A lens barrel as defined in claim 4, wherein said second through holes are disposed outside said ring shaped receiving wall and close to said connection tubular portion.

6. A lens barrel as defined in claim 1, wherein said plural retaining claws are at least three retaining claws, and said plural first through holes are at least three through holes.

7. A lens barrel as defined in claim 6, further comprising two slits, formed in said barrel body, so positioned that each of said plural retaining claws is located therebetween, for partial separation thereof, and for imparting resiliency thereto.

8. A lens barrel as defined in claim 7, wherein each of said plural first through holes is located in a position between said slits associated with one of said retaining claws.

* * * * *